(12) United States Patent
Ford et al.

(10) Patent No.: US 7,815,224 B2
(45) Date of Patent: Oct. 19, 2010

(54) MULTI-MEDIA ROTARY UNION

(75) Inventors: Scott K. Ford, San Jose, CA (US); Anthony R. Sacramento, Jr., Libertyville, IL (US)

(73) Assignee: Deublin Company, Waukegan, IL (US)

( * ) Notice: Subject to any disclaimer, the term of this patent is extended or adjusted under 35 U.S.C. 154(b) by 774 days.

(21) Appl. No.: 11/435,191

(22) Filed: May 16, 2006

(65) Prior Publication Data

US 2006/0273579 A1    Dec. 7, 2006

Related U.S. Application Data

(60) Provisional application No. 60/681,595, filed on May 17, 2005.

(51) Int. Cl.
*F16L 17/00* (2006.01)
(52) U.S. Cl. .................. 285/95; 285/101; 285/336; 285/351
(58) Field of Classification Search ............ 277/352, 277/358; 285/95, 98, 101, 110, 120.1, 121.3, 285/121.4, 336, 351, 187, 905, 925
See application file for complete search history.

(56) References Cited

U.S. PATENT DOCUMENTS

| | | | |
|---|---|---|---|
| 2,723,136 A | 11/1955 | Deubler et al. | |
| 3,002,769 A | 10/1961 | Deubler et al. | |
| 3,273,592 A * | 9/1966 | Deubler et al. | 137/624.13 |
| 3,405,959 A * | 10/1968 | Walker | 285/276 |
| 4,296,952 A * | 10/1981 | McCracken | 285/98 |
| 4,345,783 A * | 8/1982 | Bergstrand | 285/12 |
| 4,540,201 A * | 9/1985 | Richardson | 285/101 |
| 4,570,978 A | 2/1986 | Arendt | |
| 5,022,686 A | 6/1991 | Heel et al. | |
| 5,174,614 A * | 12/1992 | Kaleniecki | 285/279 |
| 5,199,748 A | 4/1993 | Jung et al. | |
| 5,577,775 A * | 11/1996 | Pearson et al. | 285/24 |
| 5,617,879 A | 4/1997 | Kubala | |
| 5,651,567 A | 7/1997 | Kaleniecki et al. | |
| 5,669,636 A | 9/1997 | Kubala | |
| 5,707,186 A * | 1/1998 | Gobell et al. | 409/136 |
| 5,716,080 A * | 2/1998 | Kaleniecki | 285/279 |
| 5,922,941 A * | 7/1999 | Winkler et al. | 73/40 |
| 5,941,532 A | 8/1999 | Flaherty et al. | |
| 6,149,160 A | 11/2000 | Stephens et al. | |
| 6,325,380 B1 | 12/2001 | Feigl et al. | |

(Continued)

FOREIGN PATENT DOCUMENTS

JP    10302395    4/1997

*Primary Examiner*—Aaron Dunwoody
*Assistant Examiner*—Fannie Kee
(74) *Attorney, Agent, or Firm*—Leydig, Voit & Mayer, Ltd.

(57) ABSTRACT

A rotating union communicates with a rotor member and is operable with either compressible or incompressible coolant media that enters the union through a media inlet. The union includes a housing having a counterbore and a tubular carrier member axially moveable in the housing. The union includes a primary seal assembly having a rotating seal member mounted to the rotor member and a non-rotating member mounted to the carrier member and a secondary seal member positioned about the carrier member. The range of the balance ratio of the primary seal assembly is disclosed when the primary seal assembly has imposed upon it a closing force, an opening force or no force.

4 Claims, 7 Drawing Sheets

U.S. PATENT DOCUMENTS

| | | |
|---|---|---|
| 6,406,065 B1 | 6/2002 | Ott et al. |
| 6,412,822 B1 | 7/2002 | Omiya et al. |
| 6,485,062 B2 | 11/2002 | Omiya et al. |
| 6,508,472 B2 | 1/2003 | Omiya et al. |
| 6,726,213 B2 | 4/2004 | Wang |
| 6,752,433 B2 | 6/2004 | Frost |
| 2002/0000251 A1* | 1/2002 | Suzuki et al. ............... 137/580 |
| 2004/0119280 A1 | 6/2004 | Kubala |

* cited by examiner

MULTI-MEDIA ROTARY UNION

BACKGROUND OF THE INVENTION

The present invention relates to fluid coupling devices such as rotating unions and, more particularly, to an improved seal design that permits a coupling device, having a single inlet passageway and latching external means of lubricating the sealing surfaces used therein, to be operated with lubricating media, such as water-based or oil-based coolants, with non-lubricating media, such as dry air and gases, and with no media of any kind.

Rotating unions are known alternately as fluid couplings, coolant unions, or rotary joints and are employed in high-speed drilling and boring transfer operations, in high-speed machine tool spindles and in other operations where it is necessary to transfer a fluid medium to a rotating device. To optimize the operation of high-speed machine tools, rotating unions are required to conduct either a liquid, such as a water-based or an oil-based coolant, or a dry gas, such as air, from a source of the particular coolant to the rotating machine tool. One such application of a rotating union is the delivery of a liquid to the rotating machine tool as a coolant and lubricant and the subsequent delivery of air to the rotating machine tool for cleaning the machine tool or work area. Another application of a rotating union involves the high-speed machining of special heat-treated steels, wherein the cutting tool may become so hot that a water-based or oil-based coolant would result in thermal shock of the cutting tool. Such applications warrant the use of air-based coolants to cool the cutting tool. A third application of a rotating union involves the machining of certain medical components, where contact with a lubricating medium would render the finished part unfit for use.

When a rotating union must conduct a lubricating medium, one of a number of different arrangements may be employed to ensure tight engagement of the rotating and non-rotating seal members. However, in all such arrangements, the interfacing surfaces of the seal members must be lubricated to avoid a condition known in the art as "dry running". Known prior art, such as U.S. Pat. Nos. 6,149,160, 6,325,380 and 6,726,213, describe a number of treatments of the face seals which promote lubrication of the interfacing seal surfaces. The running condition results in increased wear on the interfacing seal surfaces, particularly at high rotational speeds, and extended periods of dry running operation will cause severe damage to the seal members, thereby requiring replacement of some or all of the rotating union.

When a rotating union must operate in the absence of any medium, the dry running condition is typically prevented by automatically separating the rotating and non-rotating seal surfaces. Such arrangements are commonly referred to as "pop off" designs. In such designs, the non-rotating seal surface is mounted on a carrier that moves axially in relation to the rotating seal surface and engages the rotating seal surface in the presence of a medium and disengages the rotating seal surface in the absence of a medium. However, single-inlet "pop off" rotating unions have heretofore had the disadvantage of engaging the seal surfaces in the presence of both lubricating and non-lubricating media.

When a rotating union must conduct a non-lubricating medium may be employed to separate the interfacing seal surfaces by a microscopic amount to prevent day running and to insure that the interfacing surfaces are not in direct contact. U.S. Pat. Nos. 5,669,636 and 6,406,065 are examples of rotary unions that require at least two separate inlets to operate with lubricating and non-lubricating media. Such arrangements have the disadvantage of requiring complicated and additional piping and valves systems to control the multi-media operations.

Still another arrangement to maintain contact between the interfacing seal surfaces for conducting a non-lubricating medium is described in Japanese application 10-302395 (PCT 2000-130665, for example). To overcome the problem of dry running, such an arrangement attempts to lubricate the interfacing seal surfaces with a separate, externally supplied medium, such as an oil mist. However, such an arrangement has the disadvantage of requiring a separate source of dispensing system for providing the oil mist to the interfacing seal surfaces. This system adds cost and complexity and such arrangements have the further disadvantage of allowing the oil mist to contaminate water-based coolant. This contamination can occur both outside the seals, as a result of excess oil mist running into the rotating union's drain line, and inside the seals, as a result of oil mist being conveyed by so-called "hydropads" or grooves, a concept described in U.S. Pat. No. 5,941,532. Either results in so-called "tramp oil" that must be filtered out from the liquid or water-based coolant, creating further expense in the operation of the rotary union.

As used in the disclosure that follows and as is well known in the art, the term "balance ratio," B, is defined as the ratio between the average load imposed by the sealed pressure on the seal face of the primary seal assembly of a rotary union, $p_f$, over the sealed pressure, p, which can be generally expressed algebraically as:

$$B = \frac{p_f}{p}$$

The average load $p_f$ involves an expression of the hydraulic surface area and/or dimensions of hydraulic surfaces that contribute to the action of a hydraulic force on the primary seal assembly. In other words, the balance ratio is a non-dimensional parameter that encompasses the hydraulically significant structures of a seal that yield the net hydraulic force during seal operation. With the foregoing in mind, the net hydraulic force tending to engage or disengage a face seal is the result of a balancing between forces acting on the seal in an opening direction and forces acting on the seal in a closing direction. When the opening and closing forces are balanced, the seal will remain stationary even when pressurized. However, when either the opening or closing force is greater than the other, the seal carrier will be urged to move.

SUMMARY OF THE INVENTION

One object of the present invention is to provide a sealing design that permits a rotating union having a single medium inlet to be operated with liquid lubricating media (such as water-based or oil-based coolants), with gaseous non-lubricating media (such as dry air and gases), and with no media of any kind.

A further object of the present invention is a fluid coupling device having a secondary or single elastic seal member positioned about and surrounding the carrier member mounting the non-rotating seal member together with the predetermined control of the non-rotating seal member geometry and external forces on the non-rotating seal member.

One object of the present invention is to provide a high speed rotary union capable of utilizing either incompressible media, such as water or oil, or compressible media, such as air or gas, and wherein the media is introduced into the rotary union through a single inlet passage.

A further object of the present invention is a rotary union having a single media inlet and a single secondary seal member which results in a compact union having a reduced number of parts.

In the absence of external forces, such as those that could be generated by a spring on the non-rotating seal member, the geometry of the present invention maintains a predetermined balance ratio between 0.5 and 0.67 between the rotating and non-rotating seal faces of the primary seal assembly. When incompressible media, such as water-based or oil-based coolant is utilized, the resultant net force engages the non-rotating seal surface with the rotating seal surface in the operated, pressurized condition. Because incompressible media are generally liquid, the incompressible media serves to lubricate the interfacing seal surfaces and prevent dry running. The engaged seal surfaces prevent undesirable leakage of the media. Although U.S. Pat. No. 6,508,472 makes reference to a balance ratio, this known prior art does not suggest a particular range of balance ratios to enable a rotating union to conduct different media in the manner and structure as described in the present invention.

The outside diameter and the inside diameter of the face seals of the rotating and non-rotating seal of the primary seal assembly members are structurally arranged to create a specific balance ratio therebetween. The balance ratio is the proportion of the axial closing area to the opening area and it is preferably selected such that the balance ratio is between 0.5 and 0.67. Accordingly, during the pressurization with an incompressible media, a low balance ratio will result in reduced axial face load between the first and second seal members of the primary seal assembly. This will result in lower friction, lower wear rates and a longer seal life for the multi-media rotary union in accordance with the present invention. During pressurization with a compressible media, the low balance ratio will result in the elimination of the axial load between the seal faces, which provides a microscopic gap between the seal faces that allows for frictionless operation.

When compressible media, such as air or gaseous-based coolant is directed through the rotating union, the resultant net force separates the non-rotating and rotating seal surfaces of the primary seal assembly by a microscopic amount. This condition permits the seal surfaces to operate either with compressible media or without any lubrication from the media or from some external source, which results in no mechanical seal wear during such operation of the rotary union.

Other embodiments of the present invention compensate for the presence of external forces, from springs or other sources, by adjusting the balance ratio upward or downward to create the same distribution of opening and closing forces and the same resultant net force.

The present invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

For the purpose of facilitating an understanding of the present invention, there is illustrated in the accompanying drawings preferred embodiments thereof, from an inspection of which, when considered in connection with the following description, the invention, its construction and operation and many of its advantages will be readily understood and appreciated.

DESCRIPTION OF THE PREFERRED EMBODIMENT

Referring now to the drawings wherein like numerals have been used throughout the several views to designate the same or similar parts, there is illustrated in the drawings a multimedia coolant rotary union or coupling device 10 incorporating a primary seal assembly 30 and a secondary elastic seal member 20 in accordance with several embodiments of the present invention. The rotary union 10, as partially shown in the drawings, is utilized to conduct incompressible media, such as water or oil-based coolants, or compressible media, such as air or gas coolants from a source of coolant to a spindle or rotor 36 of a machine tool and the like, not shown. The spindle or rotor 36 could be a machine tool used in various applications such as machining centers, flexible transfer lines or any environment where either liquid or air-based fluid coolants may be used in conjunction with the rotary union 10.

Figure 1:
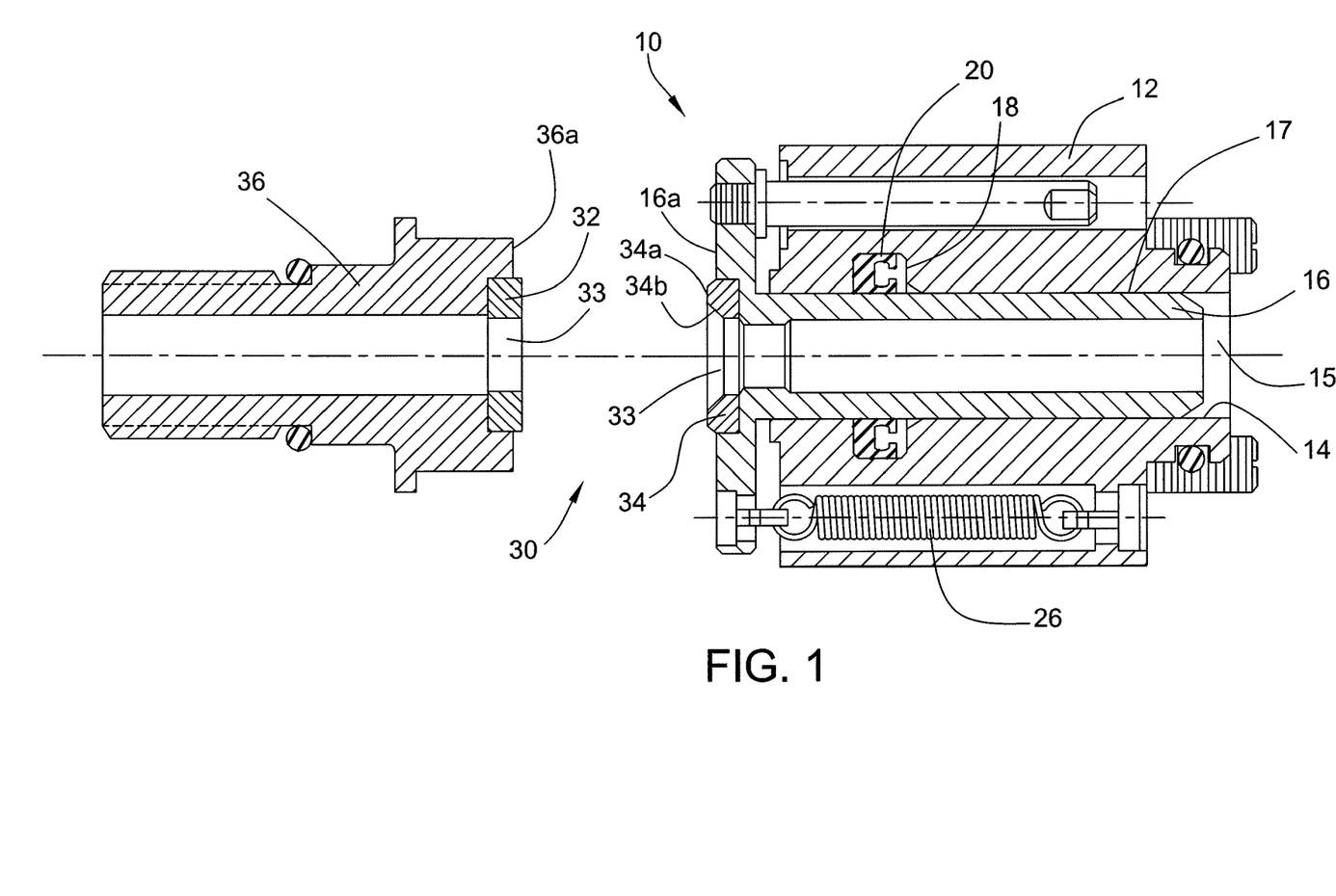
FIG. 1 is a cross-sectional view of a multi-media coolant union in accordance with the present invention, with the coolant union shown in the unoperated, unpressurized condition.

The rotating union 10 is comprised of a housing portion 12 having a cylindrical counter-bore 14 extending therethrough which is structurally arranged to receive and to permit the axial movement of the non-rotating tubular carrier member 16 therein. The tubular carrier member 16 communicates with a coolant inlet 15. The housing portion 12 includes an annular groove 18 located therein and positioned to surround the outer surface 17 of the carrier member 16. The annular groove 18 is adapted to receive the single annular elastic seal member 20 which is positioned within the annular groove to engage the inner surface 19 of the groove 18 and the outer surface 17 of the carrier member 16, best shown in FIG. 10. As shown in FIGS. 2-8, the elastic seal member 20 is shown in cross-shading only. As shown in FIGS. 1, 9 and 11, the lip members 21 and 22 and the foot connection 23 of the U-shaped elastic seal member 20 contact the inner surface 19 of the annular groove and outer surfaces of the annular groove and the outer surface 17 of the carrier member 16 and the front surface 25 of the annular groove. However, it is within the scope of the present invention that the elastic seal member 20 may be any of a number of different type elastic sealing members, as shown in FIGS. 9-12.

Figure 9:
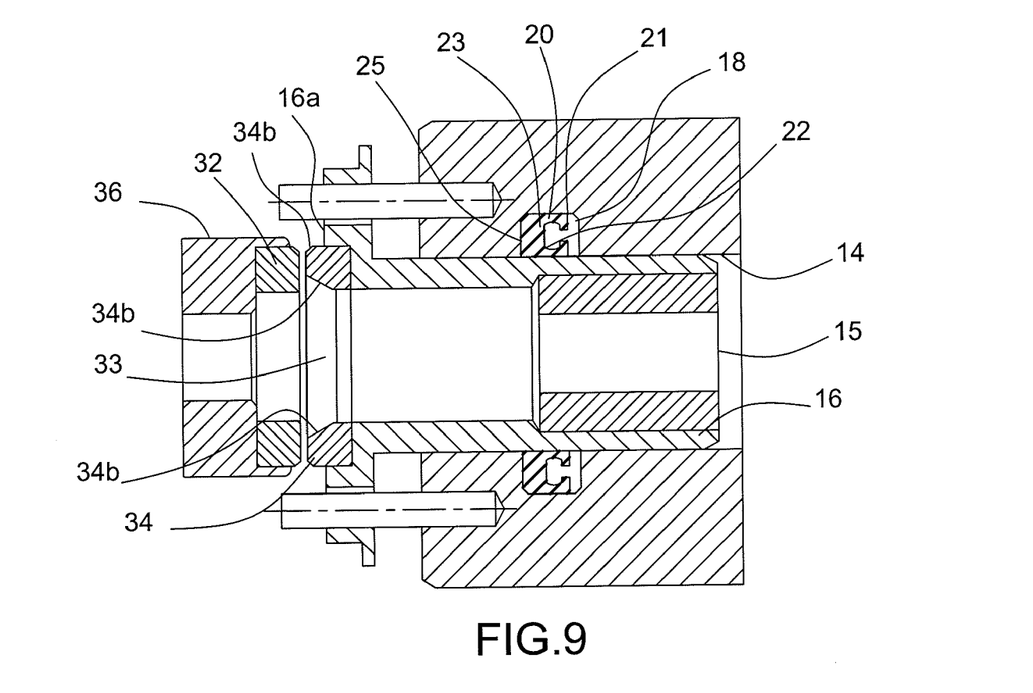
FIG. 9 is an enlarged sectional view of a further embodiment of the present invention, with at least one of the seal faces of the primary seal member being chamfered, with the coolant union in the operated, pressurized condition utilizing compressible media.
Figure 10:
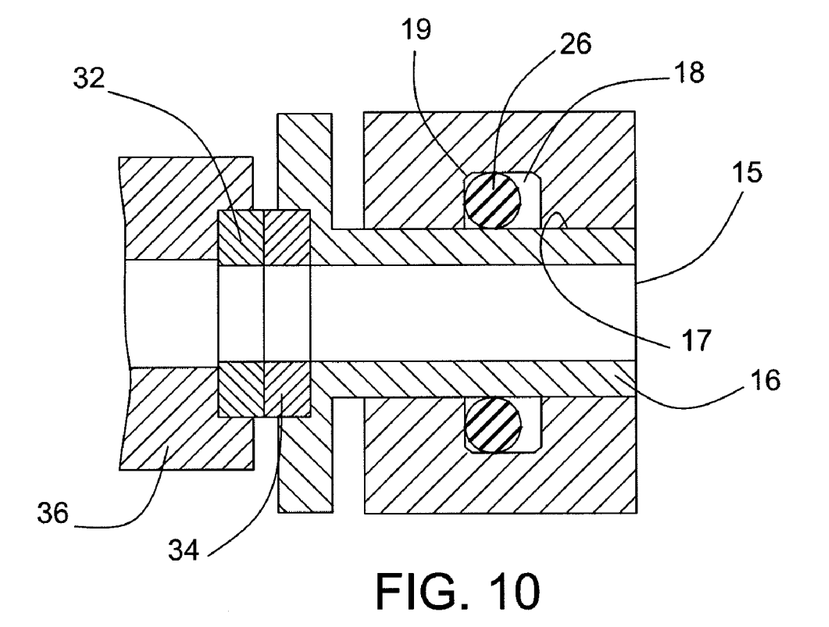
FIG. 10 is an enlarged sectional view of a further embodiment of a rotary union wherein an O-ring type elastic seal member is positioned about the carrier member in accordance with the present invention.
Figure 11:
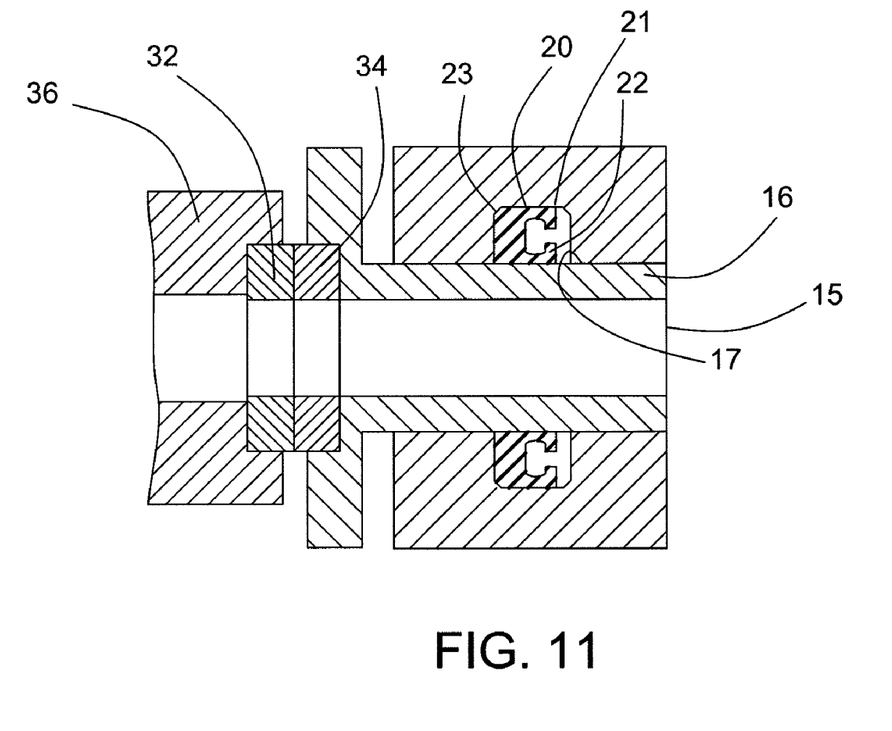
FIG. 11 is an enlarged sectional view of a further embodiment of a rotary union wherein a U-shaped type elastic seal member is positioned about the carrier member in accordance with the present invention.
Figure 12:
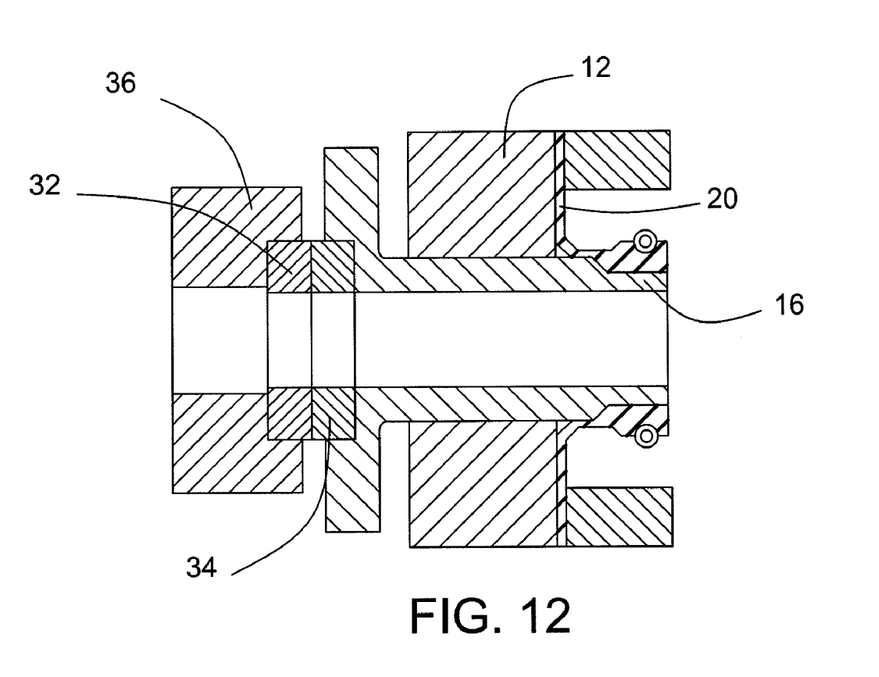
FIG. 12 is an enlarged sectional view of a further embodiment of a rotary union wherein a diaphragm type elastic seal member is positioned about the carrier member in accordance with the present invention.
Figure 13:
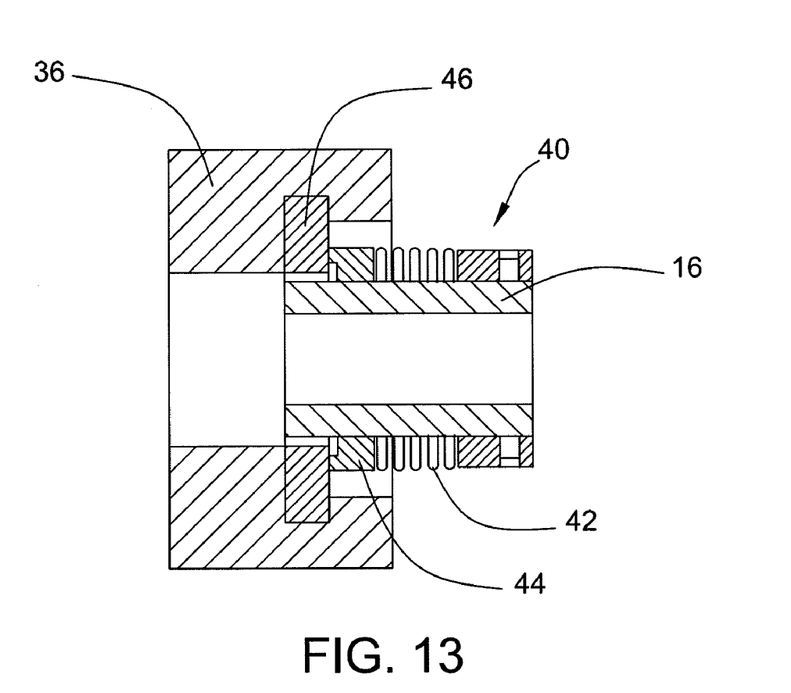
FIG. 13 is an enlarged sectional view of a further embodiment of a rotary union wherein a bellows type seal member is positioned about the carrier member in accordance with the present invention.

FIGS. 9-12 are cross-sectional views of various embodiments of the present invention that employ different types of elastic seal members. In FIGS. 1, 9 and 11, the elastic seal member is a U-shaped seal member 20 which, when positioned in the groove 18, the lip members 21 and 22 and the foot connection 23 contact the inner surface 19 of the groove 18 and the outer surface 17 of the carrier member 16. In FIG. 10 an O-ring type elastic seal member 20 is positioned within the annular groove 18 and, in FIG. 12 a diaphragm-type elastic real member 20 is positioned to engage and seal the carrier member 16 relative to the housing 12. In FIG. 13 a bellows type seal assembly 40 may be utilized to provide the seal between the seal faces of rotating seal member 32 and the non-rotating seal member 34 of the primary seal assembly 30. The secondary seal member 20 may include a flexible bellows member 42 which biases a seal nose 44 into a mating ring 46 to provide a seal in the same manner as the secondary elastic seal members 20, as discussed above.

Also, as shown in FIG. 1, the primary seal assembly of the rotating union 10 is comprised of a rotating seal member 32 which is mounted to end 36a of the stub rotor or spindle member 36 and a non-rotating seal member 34 mounted to the end 16a of carrier member 16. The non-rotating or first seal member 34 of the primary seal assembly 30 is a generally flat ring shaped member that is preferably comprised of a ceramic material having an opening 33 therein to permit coolant to pass therethrough. The non-rotating seal member 34 includes an opening 33 therethrough and an annular seal surface 34a. The carrier member 16 is axially moveable within the cylindrical bore 14 of the housing 12. In FIG. 1, the union 10 is shown in the unoperated, unpressurized condition.

Figure 2:
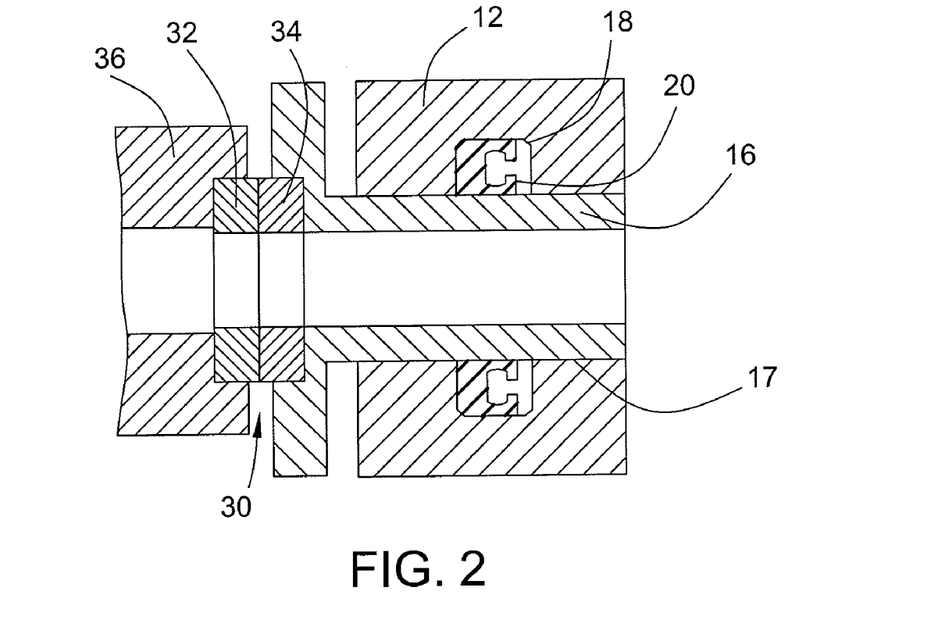
FIG. 2 is an enlarged sectional view of a further embodiment of the multi-media coolant in accordance with the present invention, with the coolant union in the operated, pressurized condition utilizing incompressible media.
Figure 3:
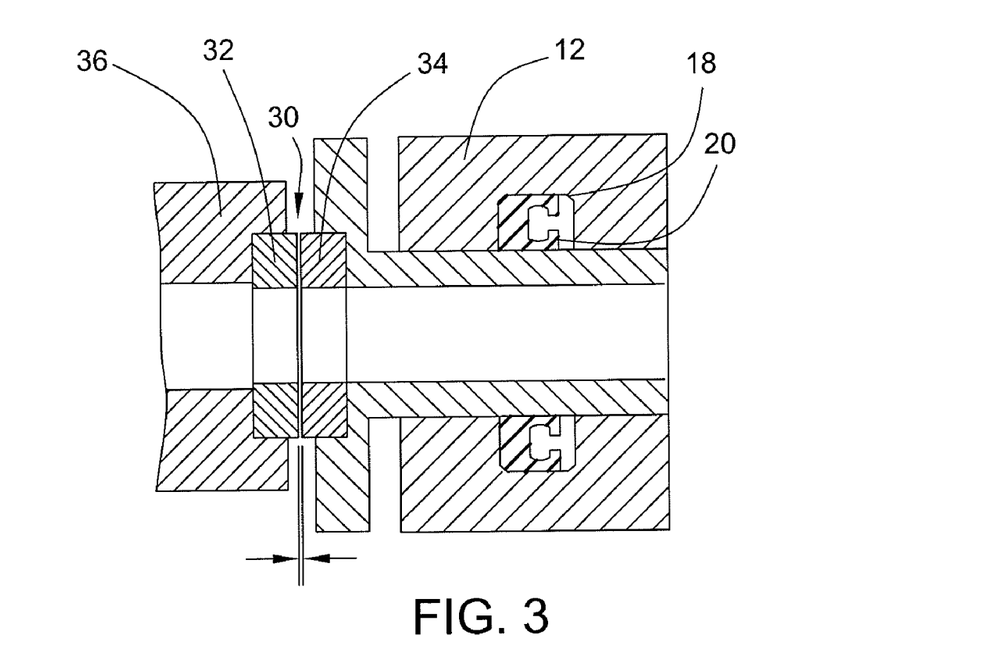
FIG. 3 is an enlarged sectional view of a further embodiment of the multi-media coolant in accordance with the present invention, with the coolant union in the operated, pressurized condition utilizing compressible media.
Figure 4:
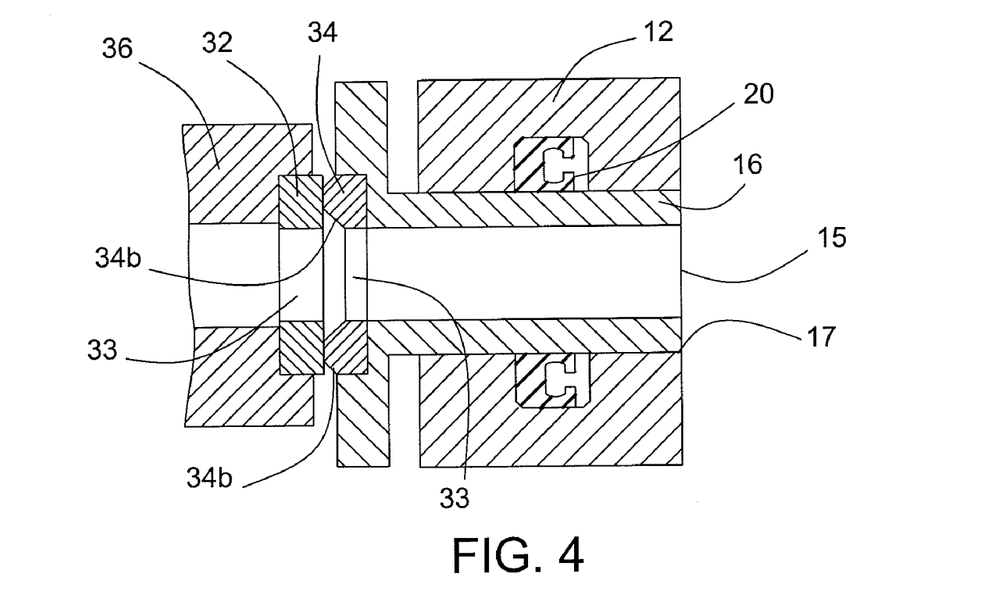
FIG. 4 is an enlarged sectional view of a further embodiment of the multi-media coolant in accordance with the present invention, at least one of the seal faces being chamfered, with the coolant union in the operated, pressurized condition utilizing incompressible media.
Figure 5:
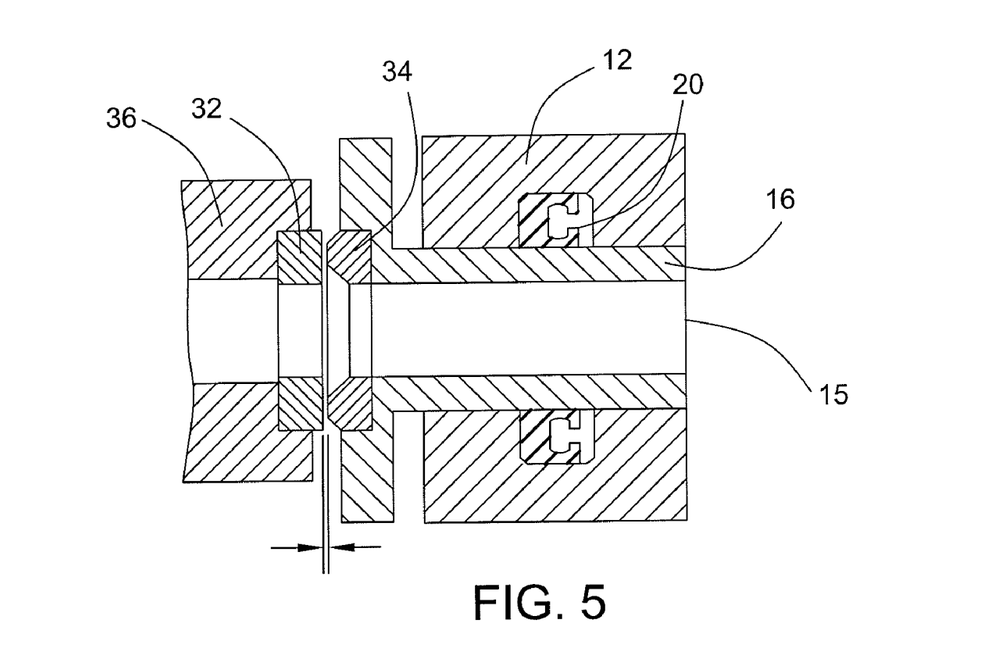
FIG. 5 is an enlarged sectional view of a further embodiment of the multi-media coolant in accordance with the present invention, at least one of the seal faces being chamfered, with the coolant union in the operated, pressurized condition utilizing compressible media.

As shown in the drawings, in FIGS. 3 and 5 the seal members 32 and 34 may have either flat facing surfaces 32a and 34a or chamfered facing surfaces 34b that provide a structure having a predetermined microscopic gap therebetween when the union is operated either with air-based or gas-based compressible fluid coolant. As shown in FIGS. 2 and 4, the seal members are engaging when the union is operated with incompressible media.

Figure 6:
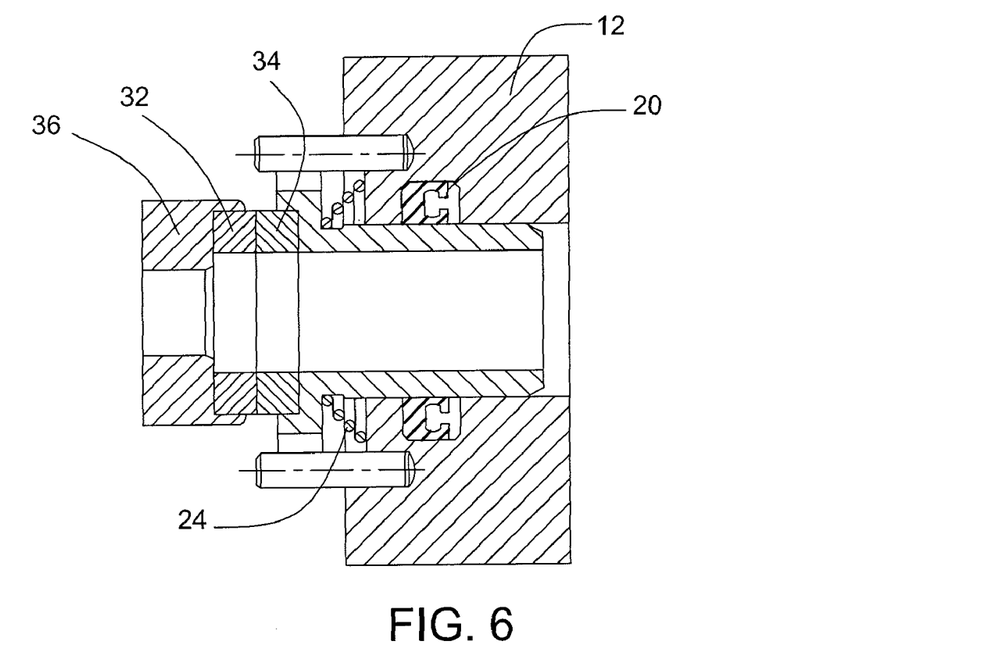
FIG. 6 is an enlarged cross-sectional view of a further embodiment of the present invention, with the multi-media coolant union utilizing a closing spring member to bias the non-rotating seal member into fluid tight engagement with the rotating seal member.
Figure 7:
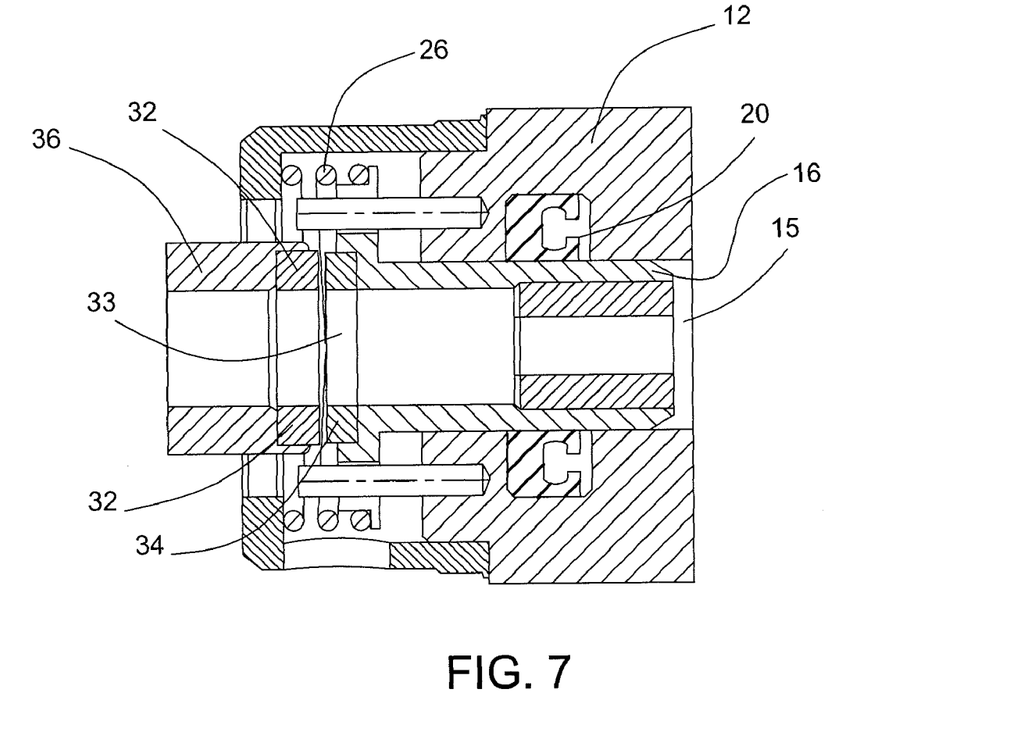
FIG. 7 is an enlarged cross-sectional view of a further embodiment of the present invention, with the multi-media coolant union utilizing an opening spring member to bias the non-rotating seal member into disengagement from the rotating seal member.
Figure 8:
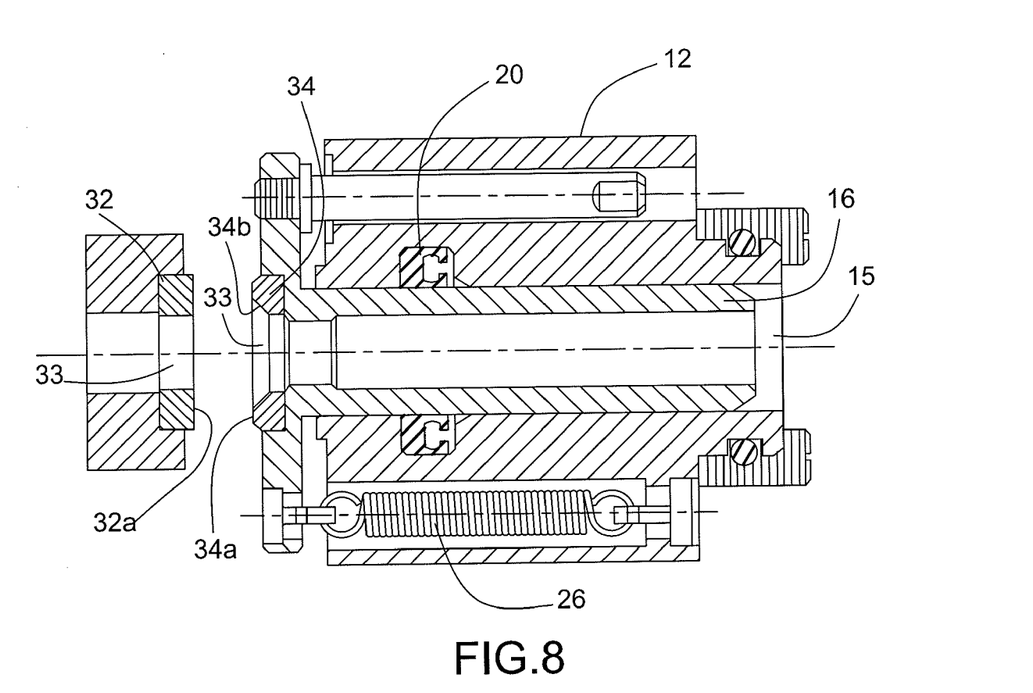
FIG. 8 is an enlarged cross-sectional view of a further embodiment of the present invention, with the multi-media coolant union utilizing an extension spring member to bias the non-rotating seal member into disengagement from the rotating seal member.

FIGS. 6, 7, and 8 are cross sectional views of several embodiments that employ external springs to bias the operation of the non-rotating seal carrier. FIG. 6 shows an embodiment that employs a closing spring 24 to bias the non-rotating seal surface 34a into fluid-tight engagement with the seal surface of the rotating seal member 32. In such an embodiment, the balance ratio is required to be less than 0.5. FIGS. 7 and 8 illustrate two embodiments that employ an opening spring member 26 to bias the non-rotating seal surface 34a and carrier member 16 away from the seal surface 32a of the rotating seal member 32 when the difference between the media pressure and the external pressure exceeds a predetermined value. In such embodiments utilizing an opening spring member 26, the balance ratio is required to be greater than 0.67. Accordingly, the balance ratio in the primary seal assembly should be between 0.5 and 0.67 when no external force or springs are employed to exert any force on the seal assembly, should be less than 0.5 when at least one closing spring is employed and should be greater than 0.67 when at least one opening spring is employed.

FIG. 9 is a cross-sectional view of an embodiment described in copending application U.S. Ser. No. 60/435,890, assigned to Deublin Company, the assignee of the present invention.

FIGS. 10 through 13 are cross-sectional views of four different embodiments of the present invention that employ different kinds of elastic seals. In all of these embodiments, the relative dimensions that are critical to the present invention remain unchanged, allowing a secondary seal or an elastic seal to be chosen for design purposes that is independent from the purpose of the present invention. It is merely sufficient that the rotating union has a single inlet opening 15 and a single secondary or elastic seal member 20 which is structurally arranged to provide the proper balance ratio to permit the operation of the rotary union with incompressible and compressible media.

The invention claimed is:

1. A fluid coupling device communicating with a rotor member and operable with either compressible or incompressible coolant media provided at a sealed pressure includes a housing having a cylindrical counterbore extending therethrough and a media inlet, a tubular carrier member having an outer surface positioned within the counterbore and axially moveable therein and communicating with the media inlet, including in combination:

a primary seal assembly comprised of a rotating seal member mounted to the rotor member and a non-rotating seal member mounted to the carrier member;

a secondary seal member positioned about the tubular carrier member and engageable with the housing to provide a seal therebetween; and wherein said primary seal assembly is structurally arranged to provide a predetermined gap between said rotating seal member and said non-rotating seal member when a compressible fluid coolant is directed through the media inlet and structurally arranged to provide that said rotating seal member engages said non-rotating seal member when an incompressible fluid coolant is directed through the media inlet, with said primary seal assembly having a balance ratio of between 0.5 and 0.67, wherein the balance ratio, B, is defined as a ratio according to the following equation:

$$B = \frac{p_f}{p}$$

where $p_f$ represents an average load imposed by the sealed pressure on a seal face of the primary seal assembly, and p represents the sealed pressure.

2. The fluid coupling device in accordance with claim 1, wherein said housing includes an annular groove having an inner surface and structurally arranged about the cylindrical counterbore and surrounding the outer surface of the tubular carrier member, with said secondary seal member positioned in said groove to engage said inner surface of said annular groove and said outer surface of the tubular carrier member to provide a seal therebetween.

3. The fluid coupling device in accordance with claim 1, wherein said secondary seal member is positioned about the tubular carrier member between the media inlet and said primary seal assembly.

4. The fluid coupling device in accordance with claim 1, wherein said primary seal assembly includes said rotating seal member mounted to the end of the rotor member and the non-rotating seal member mounted to the end of the carrier member.

* * * * *